(12) United States Patent
Månsson et al.

(10) Patent No.: US 8,318,281 B2
(45) Date of Patent: Nov. 27, 2012

(54) LAMINATED PAPER ARTICLE AND PAPER WEB

(75) Inventors: Anna Månsson, Mölndal (SE); Eva-Li Saarväli, Västra Frölunda (SE); Sverker Albertsson, Pixbo (SE); Susanne Gungner, Älvängen (SE)

(73) Assignee: SCA Hygiene Products AB, Gothenburg (SE)

( * ) Notice: Subject to any disclaimer, the term of this patent is extended or adjusted under 35 U.S.C. 154(b) by 579 days.

(21) Appl. No.: 12/281,815

(22) PCT Filed: Mar. 17, 2006

(86) PCT No.: PCT/SE2006/000343
§ 371 (c)(1),
(2), (4) Date: Sep. 5, 2008

(87) PCT Pub. No.: WO2007/108725
PCT Pub. Date: Sep. 27, 2007

(65) Prior Publication Data
US 2009/0202774 A1    Aug. 13, 2009

(51) Int. Cl.
*B32B 3/24* (2006.01)
(52) U.S. Cl. .......... 428/43; 428/198; 428/201; 428/204; 428/211.1
(58) Field of Classification Search .................. 428/198, 428/211.1, 43, 201, 204
See application file for complete search history.

(56) References Cited

U.S. PATENT DOCUMENTS

| | | | |
|---|---|---|---|
| 3,672,950 A * | 6/1972 | Brown et al. | 428/154 |
| 3,687,754 A * | 8/1972 | Stumpf | 156/72 |
| 4,325,768 A | 4/1982 | Schulz | |
| 4,978,565 A | 12/1990 | Pigneul et al. | |
| 6,106,928 A | 8/2000 | Laurent et al. | |
| 6,136,413 A | 10/2000 | Le Port et al. | |
| 6,361,784 B1 | 3/2002 | Brennan et al. | |
| 2002/0013109 A1 | 1/2002 | Nissing | |

FOREIGN PATENT DOCUMENTS

| WO | 97/20107 | 6/1997 |
|---|---|---|
| WO | 03/072345 A1 | 9/2003 |
| WO | WO 03072345 A1 * | 9/2003 |

* cited by examiner

*Primary Examiner* — Gerard Higgins
*Assistant Examiner* — Christopher Polley
(74) *Attorney, Agent, or Firm* — Young & Thompson (57) ABSTRACT

An absorbent laminated paper article is a rectangular sheet having first parallel edges in a first direction, second parallel edges in a second perpendicular direction and an article area delimited by the edges. The article includes at least two plies adhesively bonded in a bonding pattern between the plies. The bonding pattern includes bonding elements arranged along a first set of bonding lines extending from one of the first parallel edges to the other of first parallel edges in a first direction at a first angle to the first direction and along a second set of bonding lines extending from the one of first parallel edges to the other of first parallel edges in a second direction at a second angle to the first direction, the first set of bonding lines intersecting with the second set and forming an intermeshing network of bonding lines.

26 Claims, 7 Drawing Sheets

LAMINATED PAPER ARTICLE AND PAPER WEB

TECHNICAL FIELD

The invention pertains to an absorbent laminated paper article in the form of a rectangular sheet having first parallel edges in a first direction and second parallel edges in a second direction perpendicular to the first direction and having an article area delimited by said edges. The absorbent laminated paper article comprises at least two plies being bonded together by an adhesive applied in a bonding pattern between the plies and is suitable for use as a wipe, paper napkin, paper towel, toilet paper, kitchen paper, paper handkerchief or the like. The article is particularly suitable for use within the area of object wiping.

The invention also concerns an absorbent laminated paper web having parallel edges extending in a longitudinal direction and having a cross direction perpendicular to the longitudinal direction, said absorbent laminated paper web comprising at least two plies being bonded together by an adhesive applied in a bonding pattern between the plies. The paper web may be converted into individual paper articles or may be a roll product such as toilet paper, kitchen paper or the like.

BACKGROUND

In order to improve absorbency, bulk and softness of absorbent paper products such as wipes, paper napkins, paper towels, toilet paper, kitchen paper, paper handkerchiefs, or the like, it is common to laminate two or more plies of tissue paper. The resulting absorbent paper article is softer, more flexible and has greater absorbent capacity and bulk than a corresponding single-ply article having the same thickness and basis weight.

A simple and common way of joining the plies of paper towels and wipes is by means of mechanical embossing along two parallel edges on the towel or wipe. The resulting article is soft and flexible, but the plies of the article tend to separate or delaminate in the area between the bonding lines. This impairs the absorbency as well as the handling and wiping properties of the article. Edge embossing is disclosed, for instance, in EP 0 864 014.

Another way of achieving a laminated paper article is by bonding in a closely spaced pattern of bonding elements distributed over the whole surface of the article. Such bonding patterns are disclosed in U.S. Pat. Nos. 6,106,928, 6,136,413, 4,325,768, 4,978,565 and 6,361,784. Although these bonding patterns provide strong attachment between the bonded plies, the resulting paper articles are unduly stiff and therefore difficult to fold and bring to conform to a wiped surface.

Accordingly, there exists a need for an improved absorbent paper article, particularly for object wiping purposes.

The object of the present invention is to provide an absorbent paper article and an absorbent paper web comprising at least two laminated plies of paper such as tissue paper and having high softness, flexibility, absorbency and resistance to delamination.

DISCLOSURE OF INVENTION

The invention provides an absorbent laminated paper article in the form of a rectangular sheet having first parallel edges in a first direction and second parallel edges in a second direction perpendicular to the first direction and having an article area delimited by said edges, said absorbent laminated paper article comprising at least two plies being bonded together by an adhesive applied in a bonding pattern between the plies. The bonding pattern comprises bonding elements arranged along a first set of bonding lines extending from one of said first parallel edges to the other of said first parallel edges in a general direction at a first angle to said first direction and along a second set of bonding lines extending from said one of said first parallel edges to said other of said first parallel edges in a general direction at a second angle to said first direction, said first set of bonding lines intersecting with said second set of bonding lines and forming an intermeshing network of bonding lines and said absorbent paper article having a bonded surface area of from 0.6 to 6% of said article area, preferably of from 0.8 to 4% of said article area and more preferably from 1.2 to 3% of said article area.

The term "rectangular" as used herein includes also quadratic shapes.

If the bonding line is a straight line, the general direction of the bonding line coincides with the extension of the bonding line. When the bonding line is an undulating line, the general direction of the bonding line is a straight line along which the bonding line undulates. Each set of bonding lines may be arranged equidistantly spaced in the respective general direction or may be spaced with different spacing. The lines in each set of bonding lines may be grouped in two or more lines with the same spacing and with a greater spacing between the groups than between the lines within a group.

The bonded area is measured as the actual area occupied by the bonding elements in relation to the total area of the laminated paper article.

The bonding elements arranged along the bonding lines may be broken or unbroken lines, line fragments, dots or similar bonding elements. If discrete bonding elements are used, these should be well distributed along the bonding line and should preferably occupy at least 40% of the length of the bonding line, more preferably at least 50% and most preferably at least 60% of the length of the bonding line. The bonding elements may, however, constitute longer portions, corresponding to the distance between crossing points in the network of bonding lines or to the double distance between crossing points in the network if the pattern is an interwoven pattern as disclosed herein. In such embodiments, the bonding elements may have a length of from 10 to 35 cm and the bonding elements will occupy at least 75% of the length of a bonding line.

The bonding pattern according to the invention is an oversized bonding pattern, implying that when looked at, the pattern is perceived as being too large for the paper article. Since only a section of the pattern is visible on each paper article, the viewer looking at only one article will not, or at least not immediately, recognise the structure of the whole pattern. One effect of using an oversized bonding pattern is also that individual articles cut from the same web of laminated material will have slightly different appearance since they comprise different sections of the pattern.

The intermeshing bonding lines create a pattern of large unbonded areas and are so sparsely distributed over the article that only a few such unbonded areas are found on each article. Moreover, depending on how the pattern is placed in relation to the edges of the paper article, it may well be that the section of the pattern appearing on the article comprises only unbonded areas that have been cut off at the article edges.

According to a particular embodiment of the invention, the first set of bonding lines form an angle of from 20° to 70° with said first direction and said second set of bonding lines form an angle of from 110° to 160° with said first direction. It is beneficial to arrange the intersecting bonding lines so that the first set of bonding lines extend in a general direction forming an angle γ with the general direction of the second set of bonding lines that is from 10° to 170°, preferably from 45° to 135° and most preferably from 70° to 115°.

When the bonding lines are arranged in this manner, the unbonded areas delimited by the bonding lines will appear as rhomboid or approximately rhomboid.

An oversized bonding pattern in accordance with the invention offers several advantages over previously known bonding patterns. The laminated paper article in accordance with the invention has the softness and flexibility of edge embossed products but much less tendency to delamination, separation and slipping of the plies. Moreover, the bonding pattern offers production advantages in that the absorbent paper article can be produced in a continuous laminating process using rotating printing and/or embossing rolls, the intermeshing bonding lines providing even contact pressure between cooperating rolls.

The adhesive used for creating the bonding pattern may be a coloured adhesive, thus creating a visible, decorative pattern on the paper article. It is, of course possible to use more than one colour to produce a multi-coloured pattern.

In accordance with one embodiment of the invention, the network of bonding lines are arranged so that they delimit unbonded areas, each unbonded area being delimited by two lines from the first set of bonding lines and two lines from the second set of bonding lines and having a size of from 5% to 50% of the article area, preferably from 10% to 30% of the article area and most preferably from 15% to 25% of the article area. This implies that the unbonded areas are comparatively large in relation to the article area but are bordered by bonding lines so that no unbonded area extends all the way between two parallel edges on the paper article. Hence, no unbonded through-going tunnels or canals extending across the article will appear between the plies of the paper article. This is beneficial for the handling and wiping properties of the paper article in that separation and slipping of the plies is avoided.

It is an important feature of the invention that the bonding lines cross the edges of the absorbent paper article so as to provide sufficient bonding of the article edges and prevent delamination of the plies. When using the paper article for wiping, unbonded edges may catch in irregularities on the wiped object or surface and may cause the plies to be peeled apart. Accordingly, by ascertaining that the edges are sufficiently bonded, handling and using the paper article can be made without risking delamination. The bonded paper article will also be perceived by a user as a coherent item that does not have to be handled with particular care in order to keep the plies together. It has been found advantageous to arrange the bonding lines so that each of the first parallel edges of the paper article is crossed by from 2 to 20 of the bonding lines, and preferably by from 6 to 14 of the bonding lines.

If the bonding at the first parallel edges is sufficient, i.e. if the first parallel edges are crossed by at least 2 bond lines, the amount of bonding at the second parallel edges may be less than the bonding at the first parallel edges. Accordingly, the second parallel edges may be crossed by from 1 to 20 of said bonding lines, and preferably by from 2 to 8 of said bonding lines.

The bonding lines are preferably undulating lines. Such undulating lines may have a regular wave-shape with uniform wavelength and amplitude or a wavelength and/or amplitude varying in a repeating manner. Alternatively, the bonding lines may be non-regularly undulating bonding lines. Combinations of regular and non-regular undulating bonding lines are also conceivable within the scope of the invention.

Undulating bonding lines provide greater flexibility and less directional resistance to bending. Moreover, the undulating shape counteracts the formation of preferential bending lines that may appear in a pattern of straight lines. Such preferential bending lines give rise to sharp folds or wrinkles when the user grips and gathers the paper article before wiping. The folds and wrinkles may negatively affect flexibility and drapeability of the paper article and may even scratch the wiped surface. When the paper article is a facial tissue, a paper napkin, a paper towel, or the like, it is particularly important that the article is free from sharp chafing folds and wrinkles. Hence, it is generally desired to avoid the formation of straight, sharp folds in a paper article intended for wiping or polishing.

The beneficial flexibility-enhancing effect of the curved bonding lines is more pronounced when using irregular lines. It is generally preferred that the amplitude of the waves is smaller than the distance between the bonding lines in each direction so that the only intersections are between bonding lines running in different general directions. In other words, it is preferred that bonding lines within the same set of bonding lines do not cross each other.

Although the bonding lines form a network of intersecting bonding lines, it is preferred that the network of bonding lines does not comprise intersecting bonding elements. This implies that the bonding elements that are arranged along the bonding lines are interrupted at the intersections so that no actual crossings between bonded areas are found in the bonding pattern. In order to avoid that the bonding elements cross each other at the intersections between the bonding lines, it is sufficient that the intersection is free from bonding elements along one of the intersecting bonding lines. The absence of crossing bonding elements increases the flexibility of the bonding pattern and the laminated paper article and reduces the resistance to bending across the bending lines at the interruptions in the bonding lines. This flexibility-enhancing effect is greater for embodiments having both crossing bonding lines interrupted at the intersections. Moreover, the interruptions of the bonding lines at the intersections is advantageous when producing the laminated material. In a process where two or more plies of material are laminated by pressing the plies together between a pair of rollers, air may become entrapped in corners between crossing glue-lines. Such entrapped air is pressed out by the rollers and causes the glue-lines to burst in small "explosions" that may damage the glue pattern and the fibrous material in the laminated plies. However, the greatest problem is the sound created by the explosions. The multitude of tiny explosions results in a noisy working environment for operators of the laminating machines. The noise is dependent on the speed of the machine and can be very loud at high running speeds.

Another aspect of the invention provides an absorbent laminated paper web having parallel edges in a longitudinal direction and having a cross direction perpendicular to the longitudinal direction, the absorbent laminated paper web comprising at least two plies being bonded together by an adhesive applied in a bonding pattern between the plies. The bonding pattern of the laminated paper web according to the invention comprises bonding elements arranged along a first set of bonding lines extending from one of said parallel edges to the other of said parallel edges in a general direction forming an angle of from 20° to 70° with said longitudinal direction and along a second set of bonding lines extending from said one of said parallel edges to said other of said parallel edges in a general direction forming an angle of from 110° to 160° with the longitudinal direction, the bonding lines forming an intermeshing network of bonding lines and the absorbent paper article having a bonded surface area of from 0.6 to 6% of the article area, preferably of from 0.8 to 4% of the article area and more preferably from 1.2 to 3% of the article area.

This embodiment of the invention is particularly useful for paper articles such as wipes, paper napkins, toilet paper, and the like which are provided in the form of rolls from which individual articles can be separated.

The paper web can also be a web from which individual, rectangular paper articles are subsequently cut.

In order to obtain a visible pattern and a decorative effect of the bonding pattern, the adhesive used for laminating the plies in the paper web can be a coloured adhesive.

The paper web preferably comprises perforation lines extending in the cross direction of the web and dividing the paper web into individual paper articles each said individual paper article having an article area. The perforations allow the individual paper articles to be separated from the paper web by tearing along the perforation lines.

The bonding lines may be arranged so that the network of bonding lines delimit unbonded areas, each unbonded area being delimited by two lines from said first set of bonding lines and two lines from said second set of bonding lines and having a size of from 5% to 50% of the article area of an individual paper article, preferably from 10% to 30% of said article area and most preferably from 15% to 25% of said article area.

The bonding pattern according to the invention is applied to the laminated paper web so that the bonding lines reaches all the way to the edges of the web. It has been found suitable to arrange the bonding lines so that each of said parallel edges are crossed by from 2 to 20 of said bonding lines within each individual paper article, and preferably by from 6 to 14 of said bonding lines within each individual paper article.

If sufficient bonding is provided along the parallel side edges so as to obtain good integrity of the laminated paper web, it is not critical that the edges created by tearing off individual paper articles exhibit an equally high degree of bonding. Accordingly, each of the perforation lines may be crossed by from 1 to 20 of the bonding lines, and preferably by from 2 to 8 of the bonding lines.

The bonding lines may be undulating lines that may be regularly undulating or non-regularly undulating bonding lines as explained above.

It is also beneficial to the flexibility of the laminated paper web if the network of bonding lines is free from intersecting bonding elements in the same manner as the previously described laminated paper article.

BRIEF DESCRIPTION OF DRAWINGS

The invention will in the following be described in greater detail with reference to the appended drawings, wherein

FIG. 4b shows a laminated paper article according to the invention and cut from the same web as the paper article in FIG. 4a;

FIG. 5 shows a cross-section taken along the line V-V through the laminated paper article in FIG. 4a;

FIG. 6 shows a cross-section taken along the line VI-VI through the laminated paper article in FIG. 4a.

EMBODIMENTS OF THE INVENTION

Figure 1:
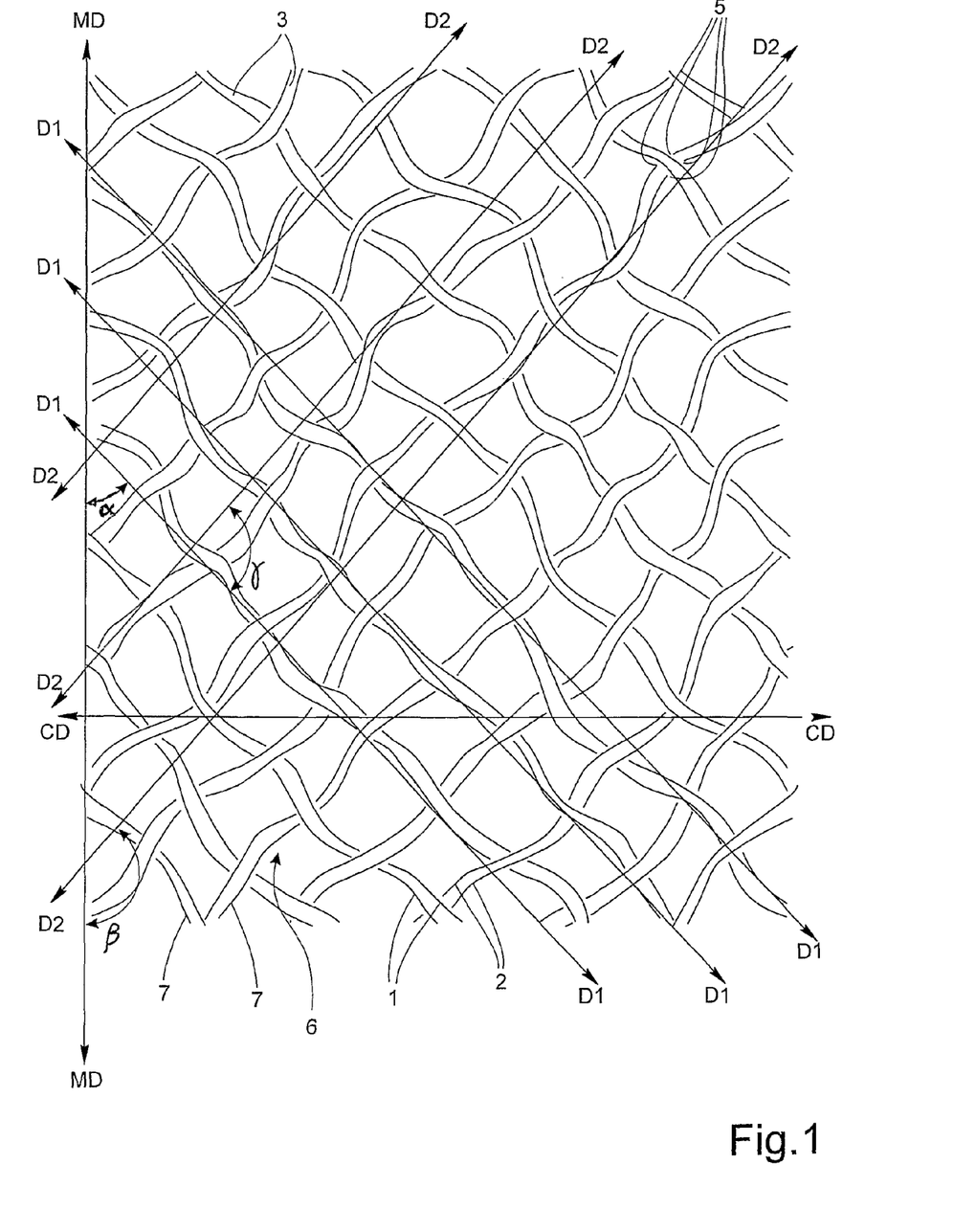
FIG. 1 shows a bonding pattern according to a first embodiment of the invention.

With reference to FIG. 1 there is shown a section of an oversized bonding pattern according to the invention. The bonding pattern is typically continuously applied to a running web by means of a patterned roll in a bonding process.

The bonding process may be a printing process wherein the bonding adhesive is transferred from the pattern roll to the web prior to joining the web with another web. Such laminating processes are disclosed in WO 93/12936 and in WO 03/072344.

Alternatively, the pattern may be applied to a web by means of an embossing roll, followed by application of bonding adhesive to the embossed pattern and subsequent joining of the web to a second web. The joining of the webs can be made in a nested configuration as disclosed in WO 95/08671. In a nested laminate, the individually embossed plies are combined and joined with the raised portions of one ply aligned and nested into recessed portions of an opposite ply. Another configuration of laminated embossed plies is known as "foot-to-foot" lamination and implies registering raised portions of a first web with raised portions on a second web. Such webs are disclosed in U.S. Pat. No. 5,443,889. It is also possible to use embossed webs having bosses with different depths, as disclosed in U.S. Pat. No. 6,106,928.

The pattern in FIG. 1 is shown at a scale of approximately of 1:6.7 and is oriented in the Fig. with the machine direction, MD and cross direction, CD as indicated in FIG. 1. The shown MD length of the pattern corresponds approximately to the circumference of a typical pattern roll used in a lamination process. When applied to a web, the shown pattern will occupy approximately 1.6% of the web area.

As is seen in FIG. 1, the pattern comprises a first set of bonding lines 1 running in a general direction D1 forming an angle $\alpha$ with the machine direction MD and a second set of bonding lines 2, running in a general direction D2 forming an angle $\beta$ with the machine direction MD.

The bonding lines 1,2 are irregularly undulating with a relatively long wave-length and small amplitude and are arranged in pairs of more closely spaced bonding lines forming structures that appear as irregular band-shaped areas 3 running across the surface.

The bonding lines from the two sets of bonding lines 1,2 form an intersecting network that appears visually as a pattern of interwoven band-shaped areas 3. The bonding lines in the first set of bonding lines 1 cross the bonding lines in the second set of bonding lines 2 at a multitude of intersections 5. At the intersections 5, the bonding lines 1,2 have non-bonded portions forming interruptions between discrete bonding elements 7 arranged along the bonding lines so that no bonding elements 7 actually cross or connect with each other. The interruptions are arranged so that each pair of bonding lines are interrupted at corresponding locations along the bonding lines 1,2. Accordingly, the bonding elements 7 along the bonding lines in a particular pair of bonding lines terminate at a short distance from a crossing pair of bonding lines and recommence at a short distance from the crossing pair of bonding lines on the other side of the crossing pair of bonding lines. The interruptions in the paired bonding lines 1,2 alternate between the first set of bonding lines 1 and the second set of bonding lines 2 resulting in a bonding pattern that looks as if the band-shaped areas 3 are woven into each other and run alternating over and under crossing band-shaped areas 3.

Such a bond pattern is aesthetically pleasing and is optimized with regard to flexibility and counteraction of the creation of preferential bending lines in a material laminated with the bonding pattern. Moreover, the pattern having no bonding elements crossing each other or connecting with each other offers production advantages in that the production noise is reduced, as previously explained.

Moreover, the bonding lines are arranged in the bond pattern so that they delimit approximately rhomboid unbonded areas. Each unbonded area is delimited by two lines from the first set of bonding lines and two lines from the second set of bonding lines. The size of the bond pattern in relation to a laminated paper article cut from a web that has been bonded with the pattern is such that each unbonded rhomboid area has a size of from 5% to 50% of the article area, preferably from 10% to 30% of the article area and most preferably from 15% to 25% of the article area. Hence, the unbonded areas are comparatively large in relation to the article area which results in the article having high flexibility, similar to an edge-bonded article. However, due to the unbonded areas being created between crossing bonding lines running in different general directions, no unbonded area extends all the way between two parallel edges on the paper article. As a consequence, the plies of the article are kept from separating from each other so that no unbonded through-going tunnels or canals are created between the plies of the paper article.

The dimensions of a laminating pattern in accordance with the invention in relation to the size of a laminated paper article cut or separated from a web laminated with the pattern are such that the pattern appears oversized when viewed on an individual paper article. Typical sizes for wipes are 360×340 millimeters, 258×340 millimeters or 200×340 millimeters. The length of a bonding element 7 from the FIG. 1 pattern would typically be from around 200 millimeters to around 250 millimeters. Hence, for the smallest size of wipe, the full length of a bonding element will often not be accommodated between the longitudinal edges of the wipe.

The sizes given above are only intended as examples of typical wipes and pattern elements in accordance with the invention and are offered to give an idea of the size of the pattern when compared to the size of an individual paper article. It is to be understood that the invention is applicable to all kinds of paper articles intended for wiping purposes ranging in size from toilet paper to larger wiping articles.

Figure 2:
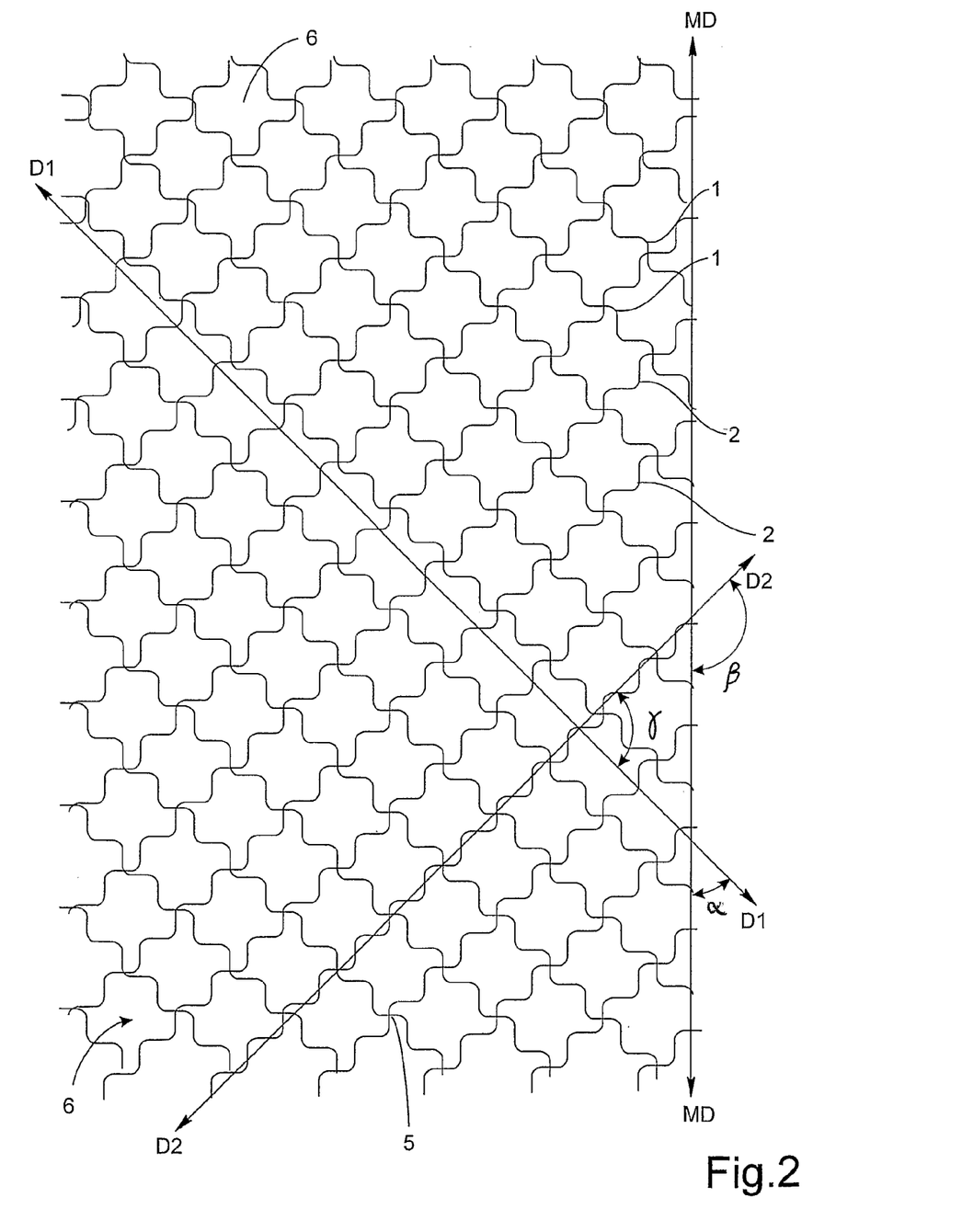
FIG. 2 shows a bonding pattern according to a second embodiment of the invention.

The bonding pattern shown in FIG. 2 is a pattern of continuous, equally spaced and regularly undulating bonding lines. The pattern consists of a first set of bonding lines 1 running in a first direction D1 deviating with an angle α of approximately 45° from the machine direction MD and a second set of bonding lines 2, running in a second direction D2 deviating with an angle β of approximately 135° from the machine direction MD.

The pattern results in a less flexible laminate than that shown in FIG. 1, but the undulating shape of the bonding lines 1,2 counteracts the formation of sharp folds and wrinkles in a laminate bonded with the pattern. In addition, the bonded material has no preferential bending direction meaning that the material can be easily gripped and gathered for wiping. During wiping, the material will bend and conform to the wiped surface.

The flexibility of a laminate bonded with the FIG. 2 pattern can be enhanced by dividing the bonding lines 1,2 into discrete bonding elements 7. Such bonding elements may be in the form of spot bonds or short line bonds with a dimension of 1-30 mm. The bonding lines may also be divided into longer sections, similar to those in FIG. 1. Combinations of spot bonds, short linear bonds or longer bond sections may also be applied. It is further conceivable to increase the flexibility of the bonded material by interrupting the line from one or both of the two sets of bonding lines at the intersections 5 between the bonding lines.

Figure 3:
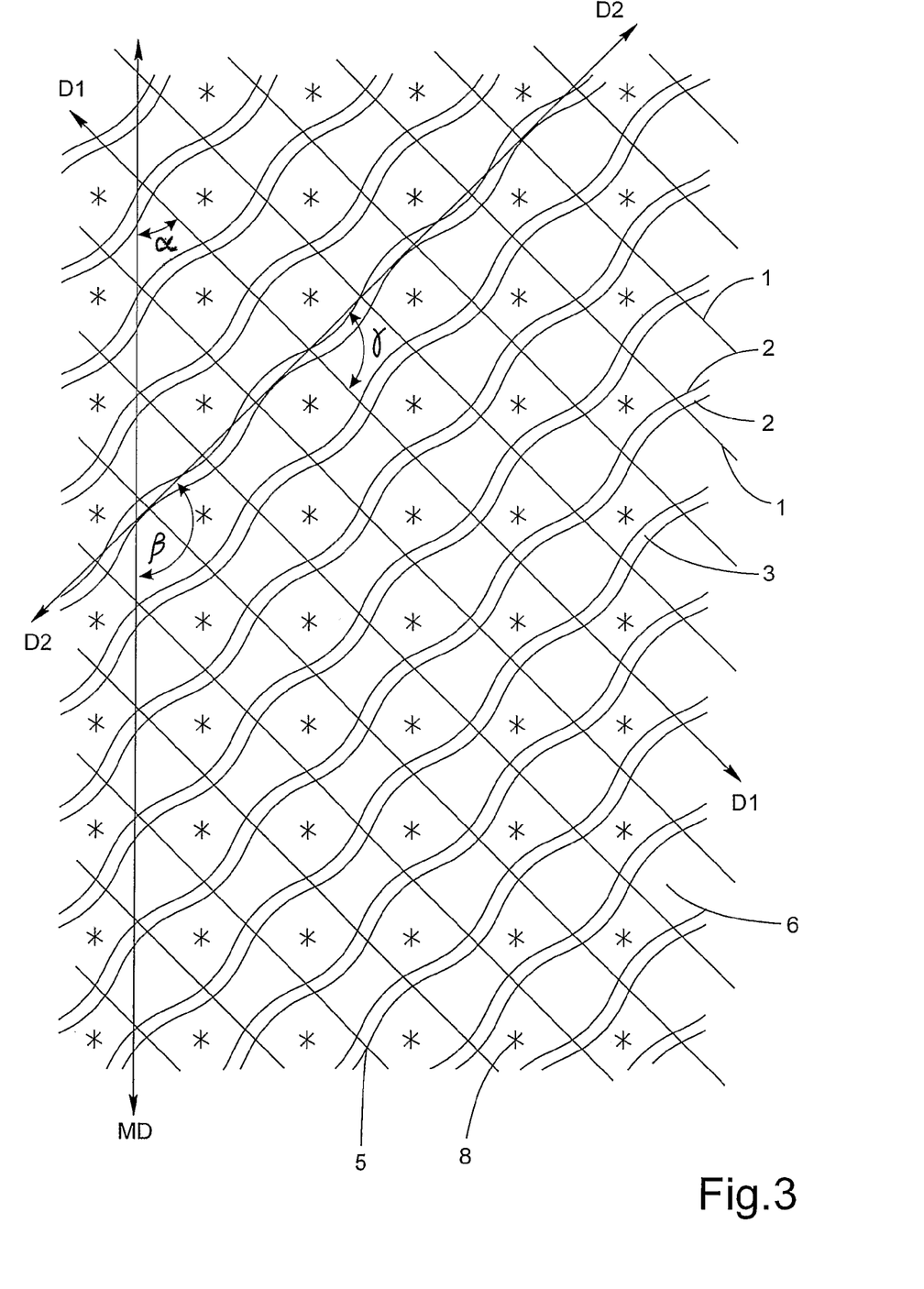
FIG. 3 shows a bonding pattern according to a third embodiment of the invention.

FIG. 3 shows another example of a bonding pattern according to the invention. The bonding pattern comprises a primary, oversized, bonding pattern including a first set of straight bonding lines 1, running in a first general direction D1, and a second set of undulating, paired bonding lines 2 running in a second general direction D2. In addition, the bonding pattern in FIG. 3 comprises a secondary bonding pattern in the form of discrete bonds shown as small stars 8 arranged in unbonded areas 6 between the bonding lines 1,2. The secondary pattern may be applied for aesthetic or informative purposes and may have any kind of shape including geometrical shapes, figurative shapes, logotypes, or the like. In order not to negatively influence the flexibility and softness of the article, the secondary pattern should occupy only a small proportion of the surface of the laminate. Hence, the total amount of bonded area of the laminate should not exceed 6%.

The bonding pattern according to the invention is made up of intersecting bonding lines 1,2 forming a first set of bonding lines 1 running in a first general direction D1 and a second set of bonding lines 2 running in a second general direction D2. The angle γ between the first set of bonding lines 1 and the second set of bonding lines 2 can be from 10° to 170°, preferably from 45° to 135° and most preferably from 70° to 115°.

Figure 4A:
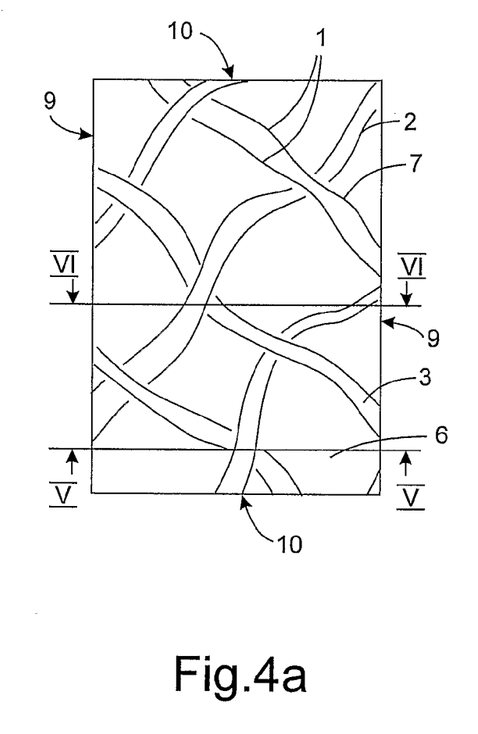
FIG. 4a shows a laminated paper article according to the invention.
Figure 4B:
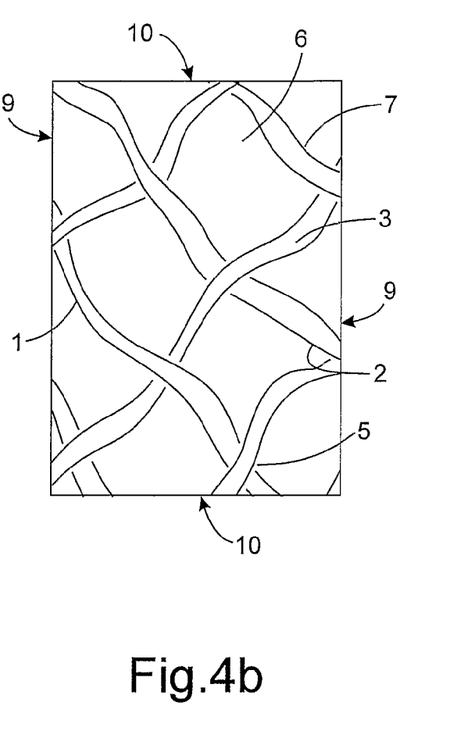

FIGS. 4a and 4b show two rectangular laminated paper articles cut from the same laminated web of material that has been bonded with an oversized bonding pattern such as that shown in FIG. 1. The different appearances of the equally sized paper articles illustrate the implication of using an "oversized" bonding pattern. Although the two articles have been bonded with the same bonding pattern, they look markedly different since they encompass different portions of the bonding pattern.

Depending on where the individual paper articles are cut from the laminated web, when cut to the size and shape shown in FIGS. 4a and 4b, each paper article will typically have from 6 to 10 bonding lines crossing each longitudinal edge 9 and from 2 to 8 bonding lines crossing each transverse edge 10.

The bonding lines extend across the laminated paper articles in an intersecting pattern resulting in an article having high resistance to delamination. Furthermore, the formation of unbonded substantially straight canals running between two parallel edges of the article is avoided. Such unbonded canals are undesired since they allow the plies in a laminated paper article to separate or slide against each other, resulting in the article being less easily handled when gripping and using for wiping.

Figure 5:
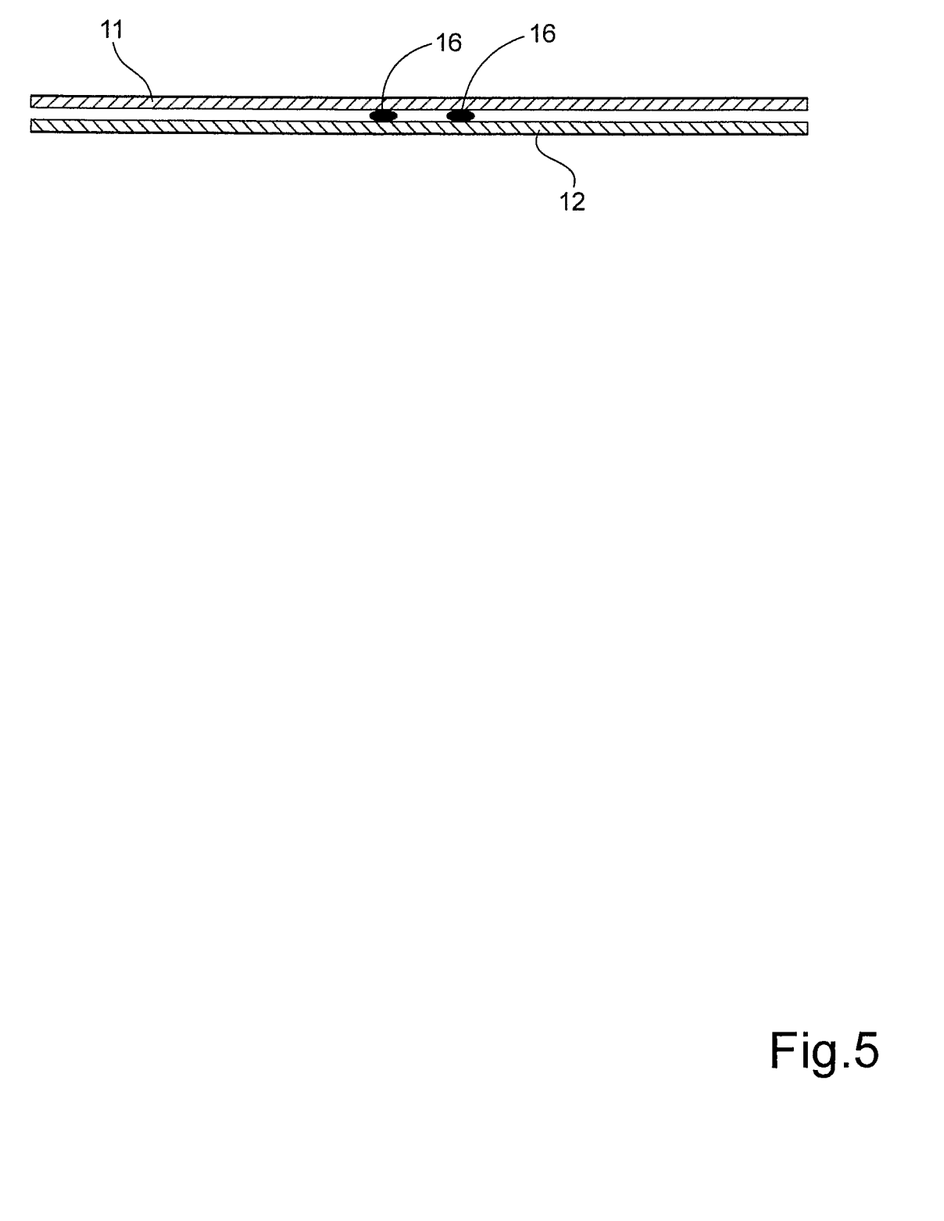
Figure 6:
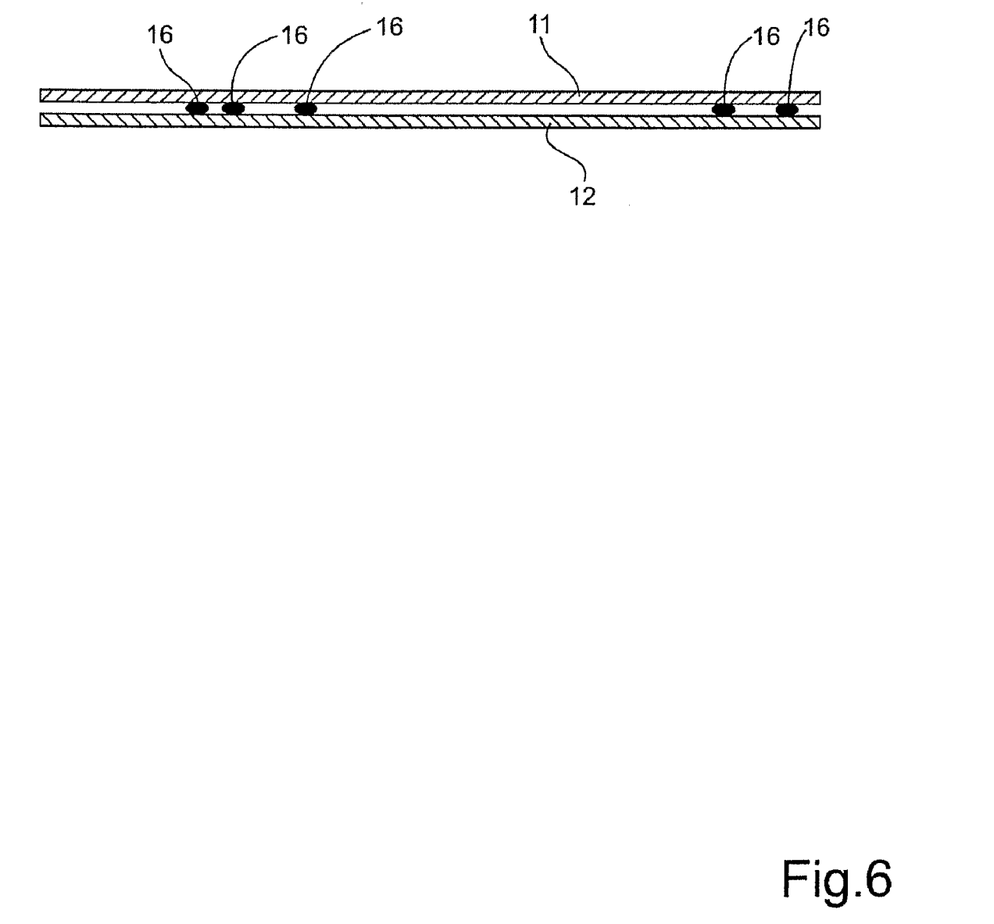

FIGS. 5 and 6 are schematic representations of cross sections through the laminated paper article in FIG. 4a. Accordingly, the dimensions, in particular the thickness of the components in FIGS. 5 and 6 are not shown to scale. FIG. 5 shows a first cross section through the laminated paper article in FIG. 4a and FIG. 6 shows a second cross section through the laminated paper article in FIG. 4b taken at a different location. Hence, FIGS. 5 and 6 show a first paper ply 11 being bonded to a second paper ply 12 by means of adhesive 16 applied along the bonding lines 1 and 2. In FIG. 5, only two bonding lines cross the transverse line at which the cross-section is taken. In FIG. 6, the transverse line at which the cross-section is taken is crossed by 4 bonding lines. The shown bonding pattern is sized and configured so that at least two bonding lines and at most 8 bonding lines cross any transverse line through the paper article.

In a corresponding manner, due to the continuous nature of the bonding pattern and the different, crossing directions D1, D2 (see FIGS. 1-3) of the bonding lines according to the invention, any longitudinal line through the article in FIGS. 4a and 4b is crossed by 7 to 10 bonding lines.

If desired, the size of the bonding pattern could be varied and the amount of binding could be greater or smaller, as set out in the appended claims.

Figure 7:
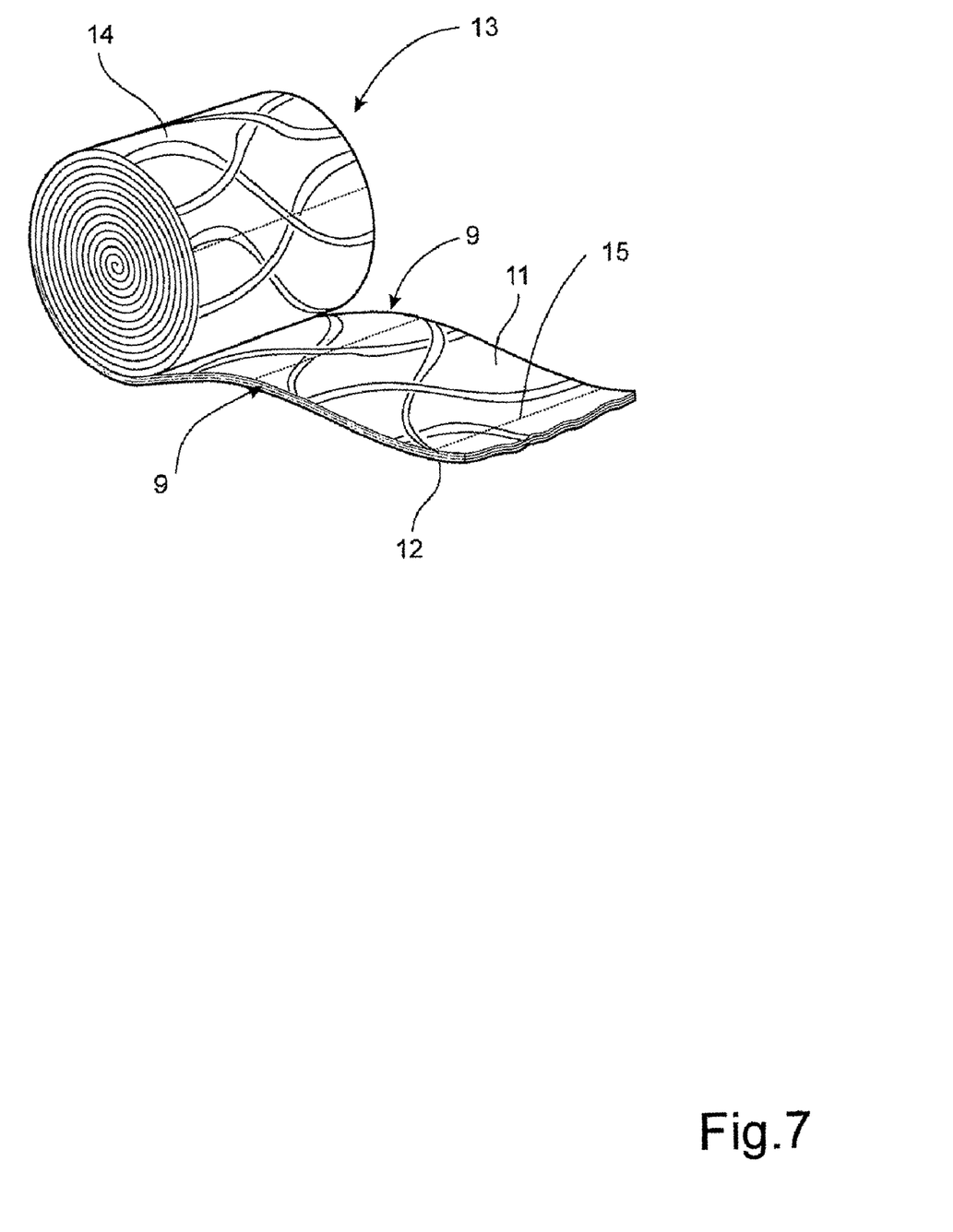
FIG. 7 shows a roll of a laminated paper web according to the invention.

FIG. 7 shows a laminated paper web 13 in accordance with a second aspect of the invention. The paper web 13 comprises two plies 11,12 of absorbent paper that have been laminated with an oversized bonding pattern and is shown in the form of a paper roll 14. The paper roll 14 may be a roll of toilet paper, kitchen paper, paper napkins, paper handkerchiefs, or the like.

The paper web is provided with perforation lines 15, arranged transversely across the web, between the longitudinal edges 9 of the paper web.

The paper articles and paper webs in the examples have been shown as two-ply structures. However, it is common in the art to use multiple plies. Further plies could be bonded with the same or different bonding patterns. However, if further plies are used, it is preferred that they are laminated with oversized bonding patterns.

Suitable materials for the laminated webs and articles according to the invention are any commonly used absorbent paper such as tissue paper, through air dried paper (TDA), etc.

The laminate may comprise three or more paper plies. The plies may be of the same kind of paper or may have different properties with respect to absorption capacity, basis weight, manufacturing technique, fibre composition, chemical additives, etc.

The bonding glue can be any suitable type of solvent-based, thermoplastic or heat activated glue known in the art. The glue may be coloured or multicoloured in order to create a visually identifiable pattern. Preferred glues are those commonly used for paper, such as carboxy methyl cellulose (CMC), polyvinyl alcohol (PVOH), ethylene vinyl acetate (EVA), polyvinyl acetate (PVAc), ethylene acrylic acid, vinyl acetate acrylic acid, styrene acrylic acid, polyurethane, polyvinylidene chloride, starch, chemically modified starch, dextrin, water soluble polymers such as latexes and milky colloids in which natural or synthetic rubber or plastic is suspended in water.

The shown bonding patterns and laminated paper articles are only intended as examples of the invention and further modifications and variations of the patterns and articles can readily be envisaged by the skilled person.

The invention claimed is:

1. An absorbent laminated paper article, comprising:
   a rectangular sheet having first parallel edges in a first or a longitudinal direction, second parallel edges in a second direction perpendicular to the first direction and an article area delimited by said edges; and
   at least two plies forming the rectangular sheet, said at least two plies being bonded together by an adhesive applied in a bonding pattern between the plies,
   wherein said bonding pattern comprises bonding elements arranged along a first set of undulating bonding lines extending from one of said first parallel edges to the other of said first parallel edges in a first general direction at a first angle of from 20° to 70° from said first direction and along a second set of undulating bonding lines extending from said one of said first parallel edges to said other of said first parallel edges in a second general direction at a second angle of from 110° to 160° from said first direction, said first set of undulating bonding lines intersecting with said second set of undulating bonding lines and forming an intermeshing network of undulating bonding lines and said absorbent paper article having a bonded surface area of from 0.6 to 6% of said article area, and
   said network of bonding lines delimit unbonded areas, each unbonded area being delimited by two lines from said first set of bonding lines and two lines from said second set of bonding lines and having a size of from 5% to 50% of said article area.

2. The absorbent laminated paper article according to claim 1, wherein each of said first parallel edges are crossed by from 2 to 20 of said bonding lines.

3. The absorbent laminated paper article according to claim 2, wherein each of said second parallel edges are crossed by from 1 to 20 of said bonding lines.

4. The absorbent laminated paper article according to claim 1, wherein said network of bonding lines is free from intersecting bonding elements.

5. The absorbent laminate paper article according to claim 1, wherein the bonded surface area is from 0.8% to 4% of said article area; each unbonded area has a size of from 10% to 30% of said article area; each of said first parallel edges are crossed from 6 to 14 of said bonding lines;
   and each of said second parallel edges are crossed from 2 to 8 of said bonding lines.

6. The absorbent laminated paper article according to claim 5, wherein the bonded surface area is from 1.2% to 3% of the article area; and each unbonded area has a size of from 15% to 25% of said article area.

7. The absorbent laminated paper article according to claim 1, wherein the adhesive is a coloured adhesive.

8. An absorbent laminated paper web, comprising:
   parallel edges extending in a first or a longitudinal direction and a cross direction perpendicular to the longitudinal direction; and
   at least two plies forming the paper web, the at least two plies being bonded together by an adhesive applied in a bonding pattern between the plies, said bonding pattern comprising bonding elements arranged along a first set of undulating bonding lines extending from one of said parallel edges to the other of said parallel edges in a first general direction at a first angle of from 20° to 70° from said longitudinal direction and along a second set of undulating bonding lines extending from said one of said parallel edges to said other of said parallel edges in a second general direction at a second angle of from 110° to 160° from said longitudinal direction, said first set of undulating bonding lines intersecting with said second set of undulating bonding lines and forming an intermeshing network of undulating bonding lines, and said absorbent paper web having a bonded surface area of from 0.6 to 6% of the area of the web, wherein said network of bonding lines delimit unbounded areas, each unbounded area being delimited by two lines from said first set of bonding lines and two lines from said second set of bonding lines and having a size of from 5% to 50% of said web area.

9. The absorbent laminated paper web according to claim 8, said paper web comprising perforation lines extending in the cross direction and dividing said paper web into individual paper articles each said individual paper article having an article area.

10. The absorbent laminated paper web according to claim 9, wherein each of said parallel edges are crossed by from 2 to 20 of said bonding lines within each individual paper article.

11. The absorbent laminated paper web according to claim 9, wherein each of said perforation lines are crossed by from 1 to 20 of said bonding lines.

12. The absorbent laminated paper web according to claim 8, wherein said network of bonding lines is free from intersecting bonding elements.

13. The absorbent laminated paper web according to claim 8, wherein said adhesive is a coloured adhesive.

14. The absorbent laminated paper web according to claim 8, wherein the bonded surface area is from 0.8% to 4% of the article area; each unbonded area has a size of from 10% to 30% of the article area; each of said first parallel edges are crossed from 6 to 14 of said bonding lines;
and each of said second parallel edges area crossed from 2 to 8 said bonding lines.

15. The absorbent laminated paper web according to claim 14, wherein the bonded surface area is from 1.2% to 3% of the article area; and each unbonded area has a size of from 15% to 25% of said article area.

16. An absorbent laminated paper article, comprising:
a rectangular sheet having first parallel edges in a first or a longitudinal direction and second parallel edges in a second direction perpendicular to the first direction and an article area delimited by said edges; and
at least two plies forming the rectangular sheet, said at least two plies being bonded together by an adhesive applied in a bonding pattern between the plies,
wherein said bonding pattern comprises bonding elements arranged along a first set of undulating bonding lines extending from one of said first parallel edges to the other of said first parallel edges in a first general direction at a first angle of from 20° to 70° from said first direction and along a second set of undulating bonding lines extending from said one of said first parallel edges to said other of said first parallel edges in a second general direction at a second angle of from 110° to 160° from said first direction, so that the first set of bonding lines extend in a general direction forming an angle γ with the general direction of the second set of bonding lines that is from 10° to 170°, said first set of undulating bonding lines intersecting with said second set of undulating bonding lines and forming an intermeshing network of undulating bonding lines and said absorbent paper article having a bonded surface area of from 0.6 to 6% of said article area, and said network of bonding lines delimit unbounded areas, each unbounded area being delimited by two lines from said first set of bonding lines and two lines from said second set of bonding lines and having a size of from 5% to 50% of said article area.

17. The absorbent laminated paper article according to claim 16, wherein the angle γ is 45° to 135°.

18. The absorbent laminated paper article according to claim 16, wherein the angle γ is 70° to 115°.

19. An absorbent laminated paper article, comprising:
a rectangular sheet having first parallel edges in a first or longitudinal direction and second parallel edges in a second direction perpendicular to the first direction and an article area delimited by said edges; and
at least two plies forming the rectangular sheet, said at least two plies being bonded together by an adhesive applied in a bonding pattern between the plies,
wherein said bonding pattern comprises bonding elements arranged along a first set of undulating bonding lines extending from one of said first parallel edges to the other of said first parallel edges in a first general direction at a first angle of from 20° to 70° from said first direction and along a second set of undulating bonding lines extending from said one of said first parallel edges to said other of said first parallel edges in a second general direction at a second angle of from 110° to 160° from said first direction, said first set of undulating bonding lines intersecting with said second set of undulating bonding lines and forming an intermeshing network of undulating bonding lines and said absorbent paper article having a bonded surface area of from 0.6 to 6% of said article area, and
wherein said network of bonding lines delimit unbonded areas, each unbonded area being delimited by two lines from said first set of bonding lines and two lines from said second set of bonding lines and having a size of from 5% to 50% of said article area, wherein the undulating shape of the bonding lines counteracts a formation of sharp folds and wrinkles in the laminate bonded with the bonding pattern, the laminated paper article has no preferential bending direction meaning such that the laminated paper article can be easily gripped and gathered for wiping, during wiping, a surface, the laminated paper article will bend and conform to the wiped surface.

20. The absorbent laminated paper article according to claim 1, wherein said network of bonding lines delimit unbonded areas, each unbonded area being delimited by two lines from said first set of bonding lines and two lines from said second set of bonding lines and having a size of from 10% to 30% of said article area.

21. The absorbent laminated paper article according to claim 1, wherein said network of bonding lines delimit unbonded areas, each unbonded area being delimited by two lines from said first set of bonding lines and two lines from said second set of bonding lines and having a size of from 15% to 25% of said article area.

22. The absorbent laminated paper article according to claim 19, wherein each unbonded area has a size of from 10% to 30% of said article area.

23. The absorbent laminated paper article according to claim 19, wherein each unbonded area has a size of from 15% to 25% of said article area.

24. The absorbent laminated paper article according to claim 1, wherein the undulating shape of the bonding lines counteracts a formation of sharp folds and wrinkles in the laminate bonded with the bonding pattern, the laminated paper article has no preferential bending direction meaning such that the laminated paper article can be easily gripped and gathered for wiping, and during wiping a surface, the laminated paper article will bend and conform to the wiped surface.

25. The absorbent laminated paper web according to claim 8, wherein the undulating shape of the bonding lines counteracts a formation of sharp folds and wrinkles in the laminate bonded with the bonding pattern, the laminated paper web has no preferential bending direction meaning such that the laminated paper web can be easily gripped and gathered for wiping, and during wiping a surface, the laminated paper web will bend and conform to the wiped surface.

26. The absorbent laminated paper article according to claim 16, wherein the undulating shape of the bonding lines counteracts a formation of sharp folds and wrinkles in the laminate bonded with the bonding pattern, the laminated paper article has no preferential bending direction meaning such that the laminated paper article can be easily gripped and gathered for wiping, and during wiping a surface, the laminated paper article will bend and conform to the wiped surface.

* * * * *